United States Patent [19]
Carson et al.

[11] Patent Number: 5,887,680
[45] Date of Patent: Mar. 30, 1999

[54] PALLET LEVEL LOADER

[76] Inventors: Steven J. Carson, 3400 Rock Creek Rd., Edmond, Okla. 73013; Charles W. Cherry, 1800 Mulberry Cr., Edmond, Okla. 73034

[21] Appl. No.: 831,445

[22] Filed: Mar. 31, 1997

[51] Int. Cl.[6] .................................................. B66B 9/16
[52] U.S. Cl. ........................................ 187/240; 187/253
[58] Field of Search ..................................... 187/240, 244, 187/222, 231, 253, 207; 254/93 R, 120, 122

[56] References Cited

U.S. PATENT DOCUMENTS

| | | | |
|---|---|---|---|
| 2,395,345 | 2/1946 | Schreck | 187/9 |
| 2,709,015 | 5/1955 | Sasgen et al. | 214/653 |
| 2,775,352 | 12/1956 | Waite | 211/134 |
| 2,993,609 | 7/1961 | Enterline et al. | 214/152 |
| 3,672,470 | 6/1972 | Ohntrup et al. | 187/1 |
| 4,073,388 | 2/1978 | Carter | 214/8.5 A |
| 4,091,906 | 5/1978 | Clarke et al. | 187/9 R |
| 4,180,145 | 12/1979 | Capps | 187/17 |
| 4,331,219 | 5/1982 | Suzuki | 187/8.5 |
| 4,356,892 | 11/1982 | Mossey | 187/9 R |
| 4,392,771 | 7/1983 | Smalley | 414/545 |
| 4,499,970 | 2/1985 | Hussey | 187/9 R |
| 4,684,310 | 8/1987 | Stange | 414/427 |
| 4,741,414 | 5/1988 | Classen | 187/18 |
| 4,854,422 | 8/1989 | Kawada et al. | 187/9 R |
| 4,915,573 | 4/1990 | Wapner et al. | 414/540 |
| 4,926,973 | 5/1990 | Smith | 187/8.59 |
| 4,940,381 | 7/1990 | Rysewyk | 414/619 |
| 4,953,979 | 9/1990 | Svensson | 414/549 |
| 5,015,146 | 5/1991 | Barnes et al. | 414/639 |
| 5,040,638 | 8/1991 | Smith | 187/8.59 |
| 5,119,946 | 6/1992 | Baker | 211/59.3 |
| 5,382,130 | 1/1995 | Kempf | 414/540 |
| 5,503,247 | 4/1996 | MacLeod | 187/240 |

*Primary Examiner*—Kenneth Noland
*Attorney, Agent, or Firm*—Dvorak & Orum

[57] ABSTRACT

Pallet level loading apparatus with a three-sided opened top enclosure and a bottom in which a cantilever-supported lifting platform is vertically movable. The lifting platform is driven by a hydraulic system housed in the rear wall of the enclosure. The platform may be locked in position at a predetermined height within the three-sided enclosure to permit its movement from place to place by a hand pallet or forklift. The apparatus further includes a torsion shaft. The torsion shaft arrangement distributes eccentric loads on the cantilever supported lifting platform so that the platform will not experience lateral tilt. Two vertical guide masts are arranged for receiving a roller arrangement of the lifting platform in order to prevent front and back platform tilt.

12 Claims, 6 Drawing Sheets

PALLET LEVEL LOADER

BACKGROUND OF THE INVENTION

1. Field of the Invention

This invention relates in general to pallet loading and unloading equipment. More particularly, this invention relates to a self-leveling pallet loader and unloader which utilizes a torsion shaft.

2. Discussion of the Prior Art

Customary warehousing operations use wooden pallets to stack goods thereon. The wooden pallets are moved from place to place by means of hand pallet trucks or fork lifts. The pallets take the form commonly known in the industry, wherein the top surface of the pallet is about six inches above floor level. One of the main problems with pallets is the safety of personnel when moving and stacking them. Another problem with palletized shipping or warehousing of products is that there is a tendency for some of the materials when stacked to slide off the pallet.

The problem outlined above has been avoided to some extent by developing a pallet-loading device which utilizes a cradle vertically movable in an enclosure and having a scissors-jack lifting mechanism in each opposing side of the three-sided enclosure. This device has achieved some acceptance, but has been found objectionable because of the lateral instability of the device and enclosure itself. Previous pallet-loading apparatus as mentioned above are typically cantilever-type, support-lifting platforms that have vertically reciprocable and driven movements caused by a hydraulic system housed in the rear wall of the three-sided enclosure. However, one shortfall of such loading devices is that due to the cantilever suspension, any imbalance in loading forces from the center of the loading platform will nevertheless cause a tilting of the platform. Such tilting of the platform is non-desirable and, depending on its severity, could even be catastrophic. Therefore, there is a need for a hydraulically driven three-sided enclosure device wherein any off balance in the loading forces operating upon the platform of said device, can be effectively and efficiently transferred such that no tilting in the lateral direction will be experienced by said device.

A primary object of the present invention is to provide an open-topped, three-sided enclosure in which tiers of goods stacked on a pallet may be prevented from spilling or sliding from the pallet due to an imbalance on either the pallet or on the platform of the three-sided enclosure.

Another object of the present invention is to provide a pallet lift apparatus in which the lift platform is a cantilever support structure, wherein an imbalance in loading on said structure is corrected such that none of the goods that are stacked on the pallet will spill or slide from said pallet.

An object of the present invention is the elimination of a separate provision for preventing reverse tilt.

A further object of the invention is improved safety and convenience of operation.

A further advantage of the invention is a substantially rigid platform when subjected to laterally eccentric loads.

SUMMARY OF THE INVENTION

The present invention concerns an open three-sided enclosure whereby access to an interior of the enclosure may be had by a fork lift or hand pallet truck.

Within the enclosure is a hydraulic-powered, vertically-reciprocable platform that is cantilever supported from the closed end which forms the rear wall of the enclosure.

The basic overview of the present pallet lifter is one of a vertically rising platform that is suspended from lifting chains located at the platform rear corners, and which is uniquely cantilevered from a pair of opposed guide masts that are contained within an enclosure that forms a rear wall of a three-sided enclosure which serves as a guarding device for personnel. The lifting force is applied to the chains via a hydraulic or mechanical actuator that is centrally located within the rear wall of the enclosure.

The uniquely cantilevered platform is essential for the present invention to achieve the equalization of eccentric loads. The present invention uses a torsion shaft equalizer assembly to maintain the platform in a laterally level condition. The equalizer assembly consists of a pair of platform lift chains, matching chain sprockets, a torsion shaft or bar, and a header weldmant. The two platform lift chains are attached to the platform at the respective two rear corners thereof, and are then routed up and over the sprockets with the ends of each chain being attached to the base frame work of the pallet lifter. The sprockets are respectively fixed at each end of the torsion shaft bar which horizontally spans the width of the platform. The torsion shaft is supported by bearings mounted within the header weldment. The header weldment is an open structure used to support the torsion shaft. The bottom center of the header weldment is attached to the top of the hydraulic lift cylinder rod. When a load on the lifting platform is found to be eccentric, the tension in the lift chains on the platform side of the sprockets will be greatest on the corner nearest the load, compared to the tension in the lift chain at the farthest corner. The imbalance of the chain tensions will create a resultant net torque in the shaft connected between the two sprockets. This net torque is resisted by an equivalent tension imbalance in the lift chains on the base frame side of the sprockets, with the greatest tension being located at the corner farthest from the load. The net tensions in all four chain segments is then equal to twice the load. The net result is that the load is balanced with respect to the hydraulic lift cylinder. Thus, it should be appreciated that this design offers a substantially rigid platform when subjected to laterally eccentric loads.

In addition, the cantilevered lifting platform is suspended from guide rollers in such a way that no deflection of the platform occurs even in a direction normal to the lateral direction. Other designs typically require a certain amount of allowed deflection to occur before sufficient reactive loads can be developed in their vertical guide members.

The cantilever platform is maintained level lengthwise by guide rollers which operate vertically along fixed mast members. The guide rollers are located at the two rear corners of the lift and are mounted at each corner to the platform structure on a common vertical center line. The rollers incorporate an eccentric mounting feature by which the platform can be adjusted to a level position in compensation for various manufacturing tolerances. The fixed mast members are an integral part of the base frame structure. There are two mast members at each corner, one each in front of and behind the platform rollers. Under normal conditions, a load on the platform produces a cantilever moment at the guide. This moment is resisted by the force couple produced by the vertically separated rollers against the mast members, with the upper roller on the front mast and the lower roller on the rear mast. When a reverse cantilever moment is encountered, such as when moving the entire lift by the platform or when the platform is lowered onto an obstacle, the upper roller will contact the rear mast and the lower roller will contact the front mast. This reverse force couple then counteracts the reverse cantilever moment and maintains the platform level.

The lift controls of the present invention incorporate a circuit which provides the ability to operate in either an automatic or a jog mode. In the automatic mode, the operator may press the "up" or "down" switch momentarily to initiate movement of the platform. The platform will then continue to its full up or down position even after the operator releases the switch. In the jog mode, the operator must maintain pressure on the switch in order to maintain movement of the platform. Upon release of the switch, the platform will stop and remain at that position. The controls also incorporate an emergency stop circuit which provides the ability for the operator to stop the lift. Once activated, this circuit must be reset by the operator before the lift can function. This circuit is operated in both the automatic and the jog mode. These circuits use a push-button station mounted on the side of the lift which contains a selector switch for the auto-jog function and a palm button for the emergency stop. Other components associated with these circuits include a time-delay relay, a pressure switch, and auxiliary contacts on the motor starter.

DETAILED DESCRIPTION OF THE DRAWINGS

DETAILED DESCRIPTION OF THE PREFERRED EMBODIMENT

Figure 1:
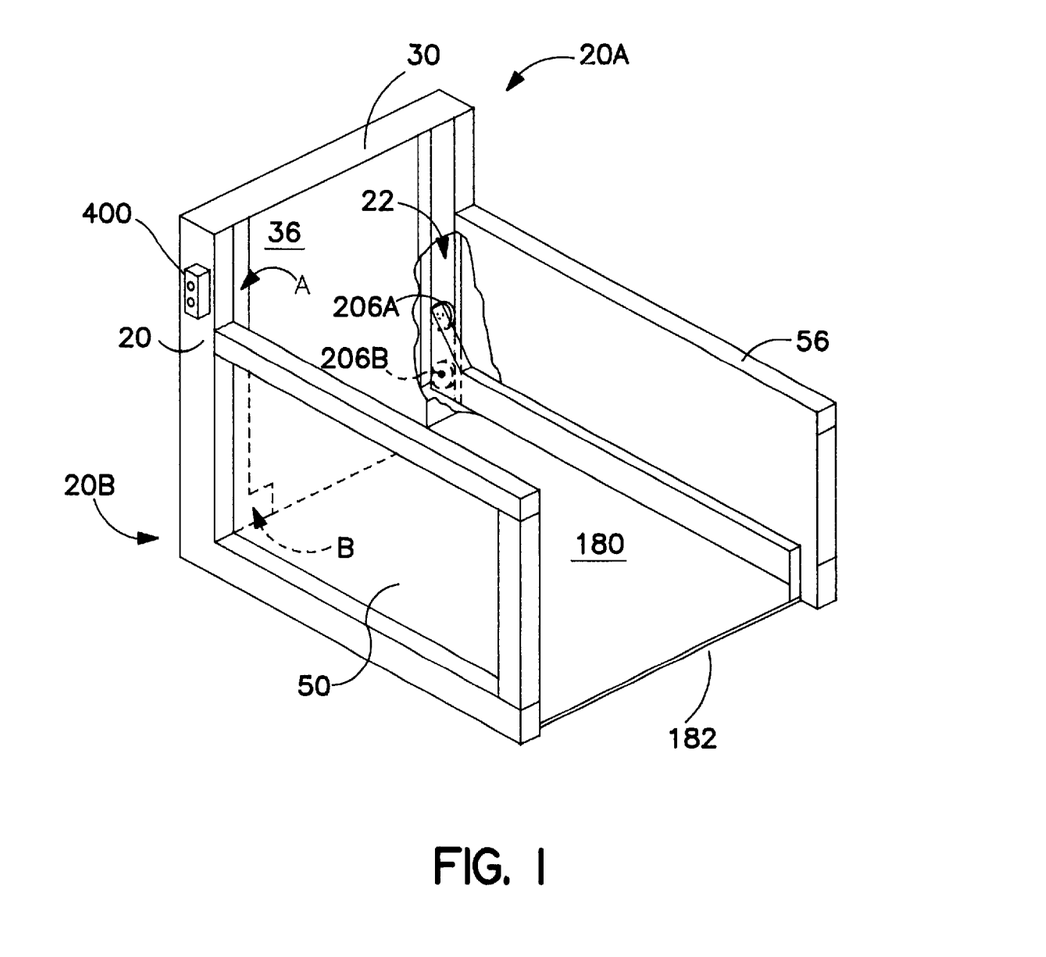
FIG. 1 is an isometric view of the pallet loading apparatus of the invention detailing the rollers inserted within an open channel of a guide mast.
Figure 2:
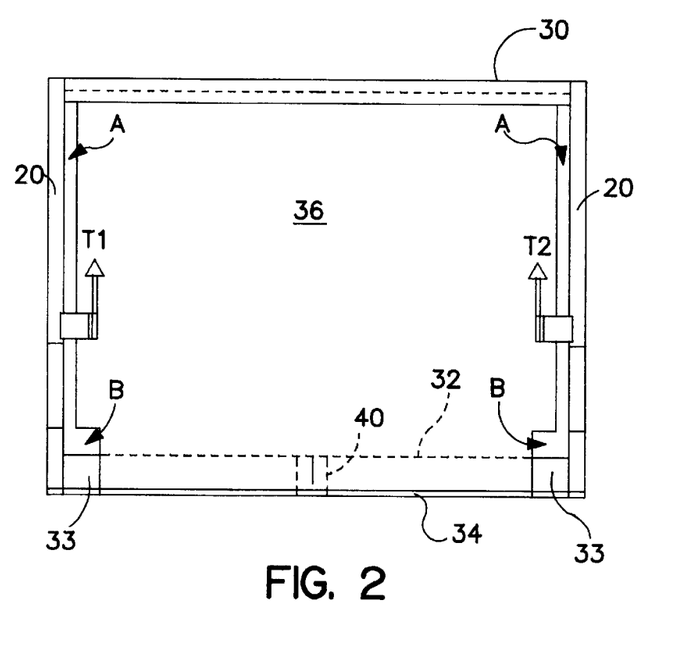
FIG. 2 is a rear view of the rear wall of the three-sided enclosure.
Figure 3:
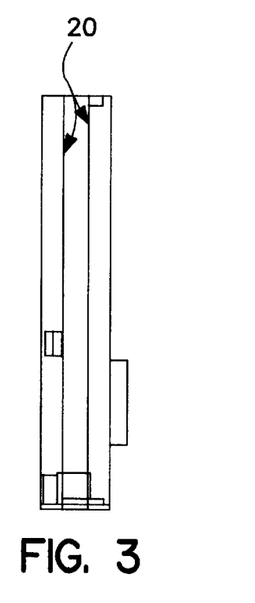
FIG. 3 is a side view of the rear wall of FIG. 2.

FIGS. 1 through 4 show the pallet level loader of the present invention which include a three-sided enclosure open at the top and bottom. The rear wall of the three-sided enclosure is comprised of an opposed pair of guide masts 20 that are interconnected together at their top and bottom ends by cross-bracing and which are enclosed so as to form an enclosure. At top end 20a, an auxiliary guide plate 30 ties the guide masts together, while at bottom end 20b, an auxiliary guide sill-flange 32 connects each guide mast 20. Auxiliary guide sill-flange 32 is seen in FIG. 3 as being located on the rearward side of each mast, away from the platform side of said mast. On the platform side of the guide mast 20, there is a rigidly attached stationary restraining plate 36 which extends upwardly to the auxiliary guide plate 30 and downwardly to a point which corresponds with the lowermost extent of the auxiliary guide sill-flange 32, namely, the base flange 34 of said sill-flange 32. FIG. 2 shows that restraining plate 36 is cut to provide slots on each lateral side thereof, in the form of vertically stacked rectangular sections, herein illustrated as "A" and "B".

A rear restraining plate 26 without cut-outs is to be anchored to the rear face 26' of the rear bracing member 26, although plate 26 is not shown in this figure. The front and rear restraining plates, along with the guide posts 20, form a housing or compartment for concealing a hydraulic lift mechanism which is electronically controlled to raise and lower the vertically reciprocable support platform 180 within the enclosure.

Figure 8:
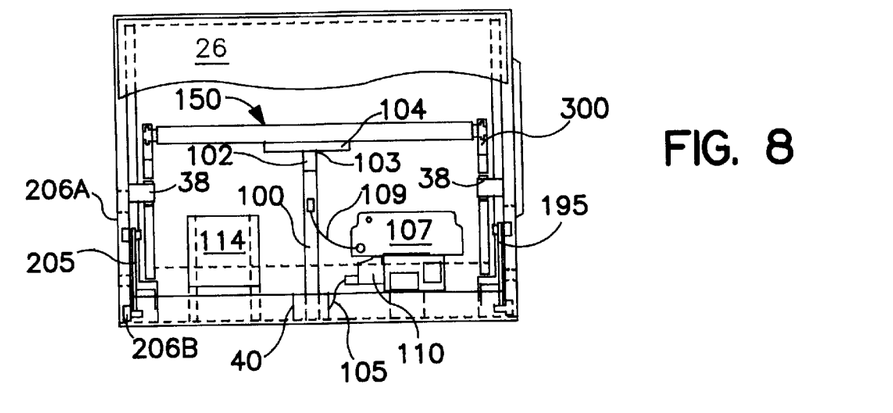
FIG. 8 is a rear view of the rear wall emphasizing the formation of the enclosure that houses the torsion shaft equalizer assembly and hydraulics.
Figure 11:
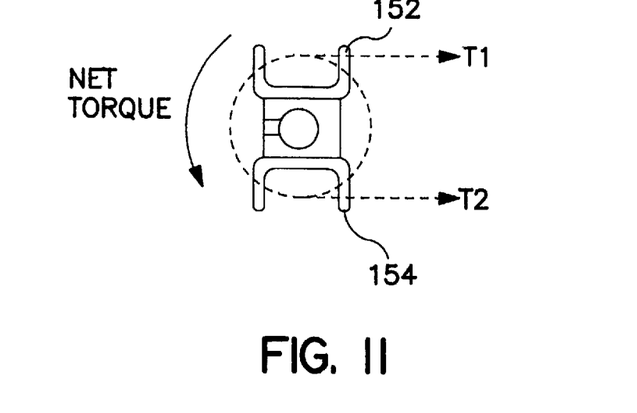
FIG. 11 is a side view of the header weldment of the torsion bar equalizer assembly.
Figure 12:
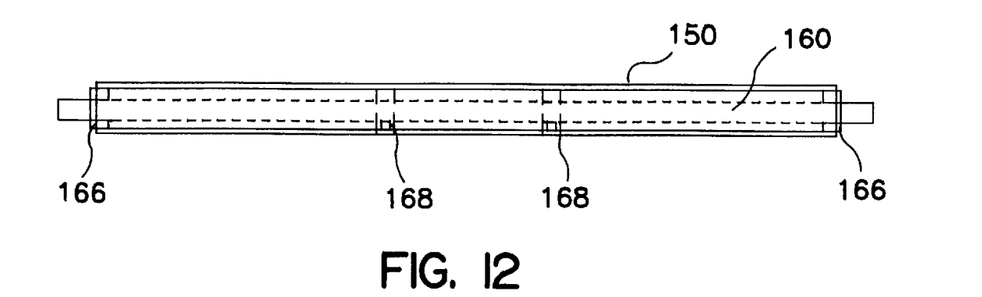
FIG. 12 is a front view of the header weldment with the torsion bar inserted.
Figure 13:
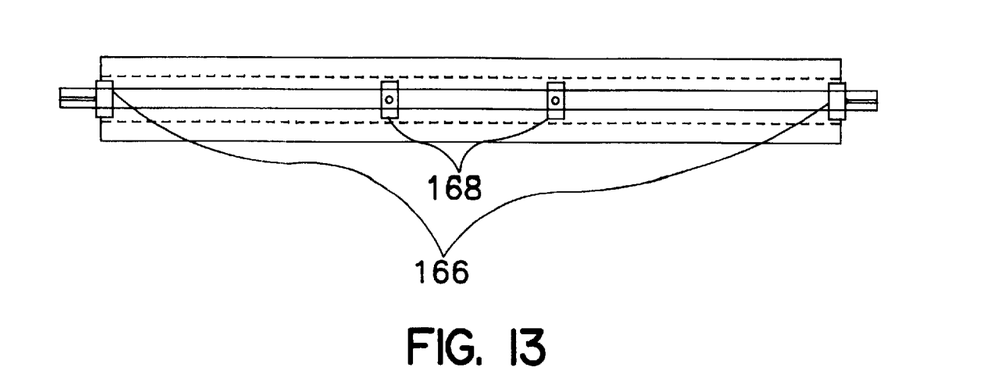
FIG. 13 is a top view of the header weldment of FIG. 12.

Referring now to FIG. 8, it should be understood that here the rear restraining plate has been partially removed in order to permit viewing of the lift mechanism. The compartment is provided with support framing and a hydraulic lift circuit that are conventional and of well-known design. It includes a lone hydraulic cylinder 100 insertably mounted within cup 40. Cup 40 is structurally tied to the framing by strut 44. The hydraulic cylinder includes a reciprocable piston rod 102 having an end 103 on which is mounted a bolster adapter plate 104 that is attached to header weldment assembly 150. The adapter plate and piston rod end are adapted so that a bolt is threaded into a complementarily threaded blind bore in the piston rod end (not shown). Other attachment arrangements of the bolster adapter plate can also be provided. FIGS. 11 through 13 illustrate that the header weldment assembly is comprised of an interconnected pair of outwardly turned C-shaped channel members 152–154 that are spaced from each other so as to receive a torsion bar shaft 160 therebetween, the shaft being one element of a torsion shaft equalizer assembly which will be described shortly. Further, it is seen that hydraulic power unit 110 pumps fluid to hydraulic cylinder 100 by way of high-pressure line 105. The hydraulic power unit 110 is controlled by an electrical controller 114 which is operable by a conventional push button station. A foot switch is an optional means of control (See FIG. 1).

The lift controls of the present invention incorporate a circuit which provides the ability to operate in either an automatic or a jog mode. In the automatic mode, the operator may press the "up" or "down" switch momentarily to initiate movement of the platform. The platform will then continue to its full up or down position even after the operator releases the switch. In the jog mode, the operator must maintain pressure on the switch in order to maintain movement of the platform. Upon release of the switch, the platform will stop and remain at that position. The controls also incorporate an emergency stop circuit which provides the ability for the operator to stop the lift. Once activated, this circuit must be reset by the operator before the lift can function. This circuit is operated in both the automatic and the jog mode. These circuits use a push-button station 400 mounted on the side of the lift which contains a selector switch for the auto-jog function and a palm button for the emergency stop, as best seen in FIG. 1. Other components associated with these circuits include a time-delay relay, a pressure switch, and auxiliary contacts on the motor starter (not shown).

Figure 4:
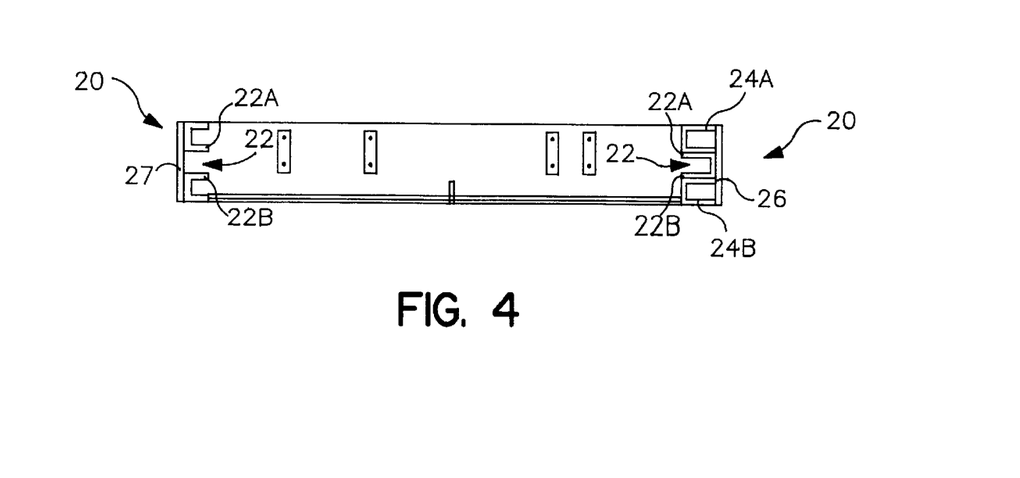
FIG. 4 is a top view of the rear wall of FIG. 2.
Figure 5:
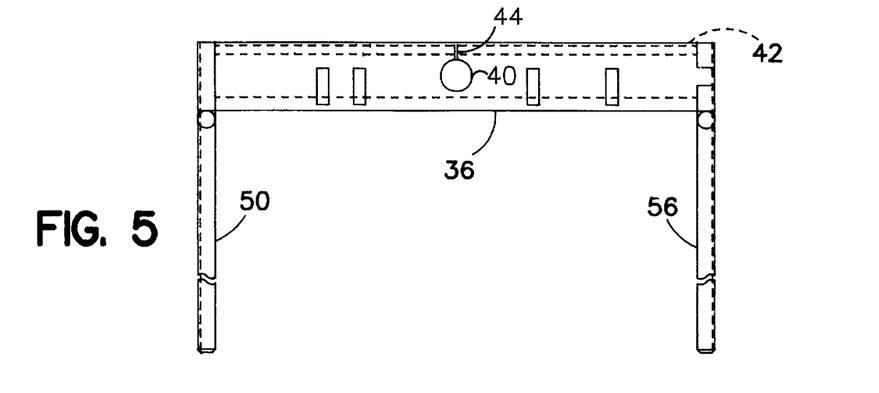
FIG. 5 is a top view of the rear wall of FIG. 2 with the side walls attached.
Figure 6:
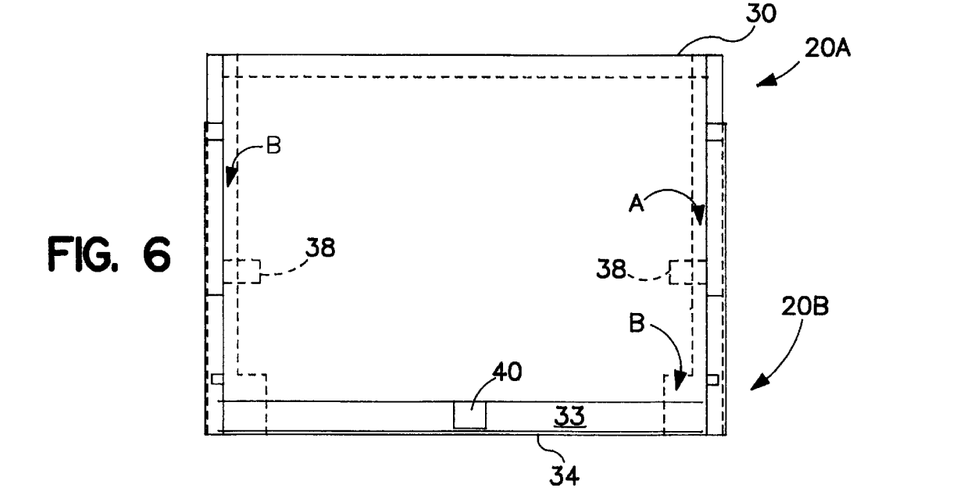
FIG. 6 is a rear view of the rear wall of FIG. 5.
Figure 7:
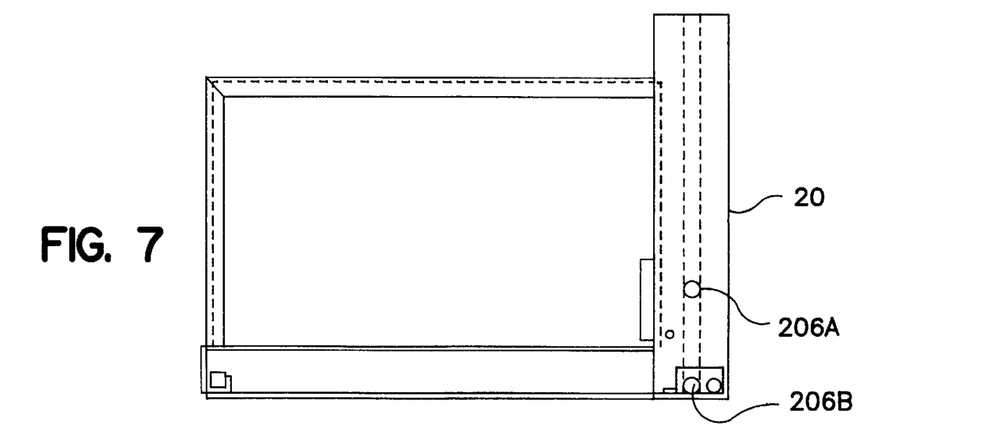
FIG. 7 is a side view of the rear wall with a side wall attached.

As FIG. 4 illustrates, each guide mast 20 includes a centrally-disposed open channel 22 that receives a pair of rollers for raising and lowering the cantilevered support platform, as will be described in greater detail later. Preferably, the open channel is formed by aligning two C-shaped angle irons and joining them together with plate 27. Each C-shaped angle iron has a web and a pair of flanges. The web 26 on each angle is connected to plate 27 leaving flanges 22A and 22B in an opposed relationship, thereby defining the open channel 22. The open channel 22 can also be formed from a length of C-shaped angle iron having flanges 22A, 22B, and web 22C, with the open sides of the C-shaped section (side opposite web 22C) facing each other. The C-shaped channel member provides an open, vertically-defined channel for containing and guiding the rollers within during their longitudinal displacement when guiding the platform, as will be described operationally in greater detail. Attached to each flange of each respective channel member (22A, 22B) is a bracing structure assembly respectively comprised of a side bracing member 24A, 24B, and 26. Bracing members 24A, 24B, are either in the form of squared tubing, or can be made from C-shaped angle iron. If C-shaped angle iron is used, its open side faces bracing plate 26. Bracing plate 26 structurally interconnects cavity 22 with 24A, 24B and ties them together. A pair of opposed chain attachment blocks 38 are fixed to a respective face 24A' of each side bracing member 24A. Each block is provided with a like longitudinal throughbore 39 before receiving a threaded shank that is attached to one end of the lifting chain, which said chain is used for raising and lowering the platform. As FIG. 2 shows, the arrows $T_1$ and $T_2$ represent the forces and direction which are experienced by the chain during the platform operation, as will be described shortly.

FIGS. 2 and 3 further illustrate that the cylindrically-shaped cup 40 is fixed to the base flange 34 of the auxiliary channel 32 and is prevented from movement by a bar 44 which is connected to front face 33 of auxiliary guide sill-flange 32. Cup 40 is open and receives the hydraulic cylinder which causes the longitudinal displacement of the loading apparatus. Cantilever support thereto, and switch means operative upon said hydraulic system to control the flow of fluid therein whereby said lift platform may be positioned vertically at desired points within said enclosure without lateral tilting of said lift platform and without forward and rearward tilting of said lift platform.

As mentioned above, the loading apparatus 10 includes a three-sided enclosure open at the top and bottom, having two sidewalls 50 and 56 which are connected at their respective ends 52, 58 to the platform side face 24' of side bracing member 24. Each sidewall is comprised of a structural frame member, respectively noted as 53 and 59, and an enclosing panel 55 and 61. Also visible is the vertically reciprocable support plate 180 made of steel or other suitable material. A front edge 181 of said plate is formed as a downwardly-turned lip 182 to facilitate loading of goods onto the platform.

Figure 14:
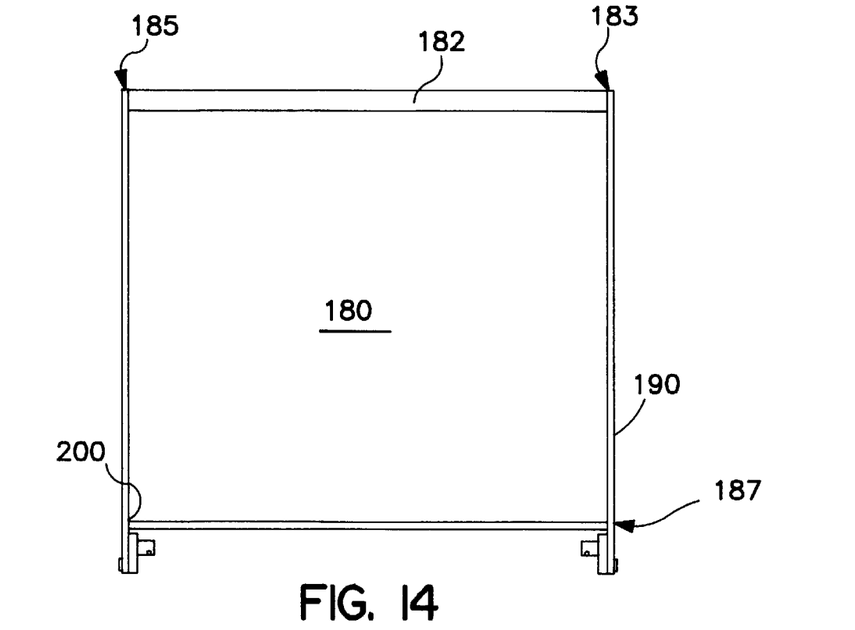
FIG. 14 is a top view of the lifting platform.
Figure 15:
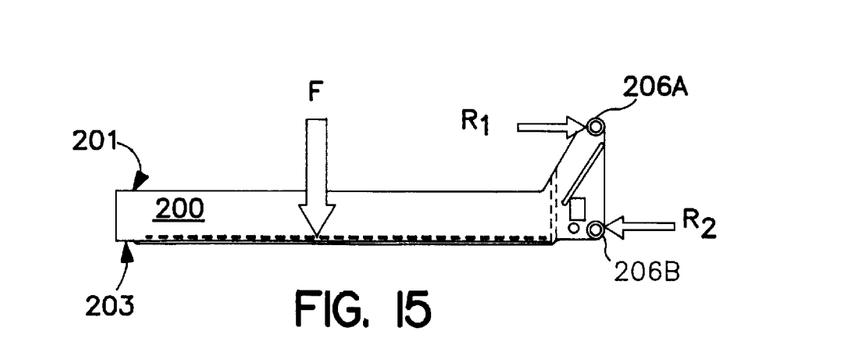
FIG. 15 is a front view of the platform of FIG. 14.
Figure 16:
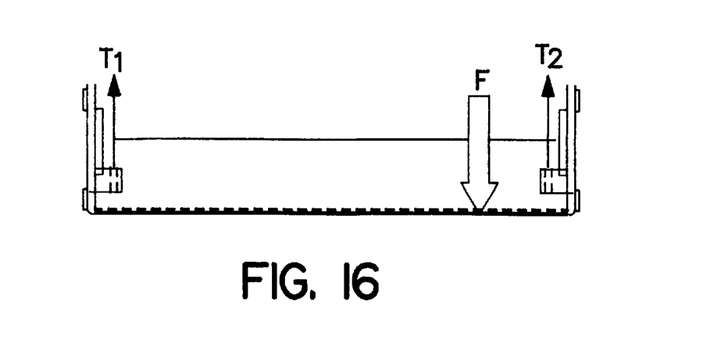
FIG. 16 is a side view of the FIG. 14 platform showing the rollers on the dog ears.

Referring now to FIGS. 14 through 16, the platform assembly and the mechanism used for preventing lateral platform tilt will now be described. More specifically, in FIGS. 14 and 15, a cantilever-supported lift platform assembly 180 is presented wherein a base plate 180 with lip 182, includes a pair of upstanding lateral side arms 190, 200, attached at respective right and left lateral ends 183, 185 of said plate, while a rear side of said plate 187, has the upstanding cross-member 186 attached thereto. The cross-member 186 extends between a lower and an upper surface of each arm, respectively illustrated at 191, 193 and 201, 203, thereby defining a respective dog-ear portion 195, 205 on each arm. Each dog ear contains the same elements, therefore only the elements on dog ear 205 will be described in greater detail. As FIG. 15 shows, a chain attachment post 207 includes a vertical throughbore 209 which receives a threaded shank that is attached to a second chain end, which said threaded part is passed through the throughbore 211 and then secured to the attachment post by a nut on the threaded shank. A diagonally-oriented stiffener 202 is also provided for strengthening each dog ear portion when the platform is loaded.

Figure 9:
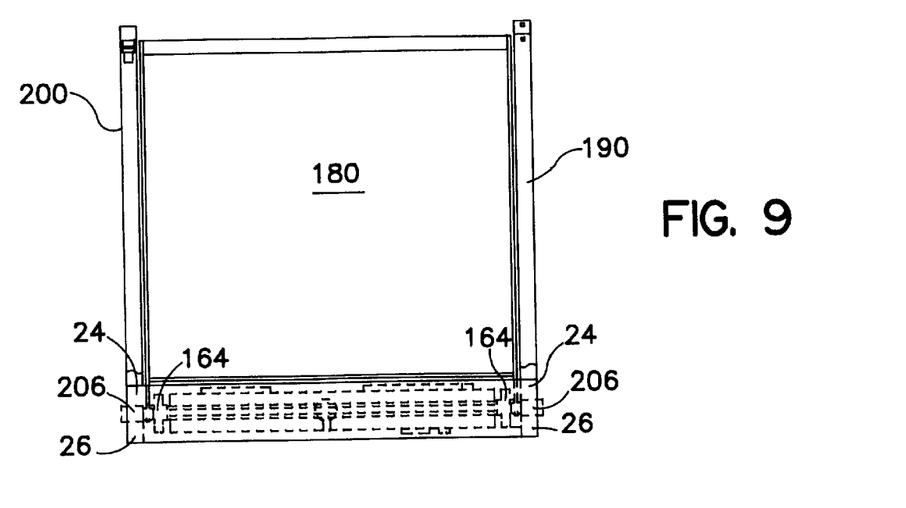
FIG. 9 is a top view emphasizing the relationship of the torsion equalizer assembly with the lifting platform.
Figure 10:
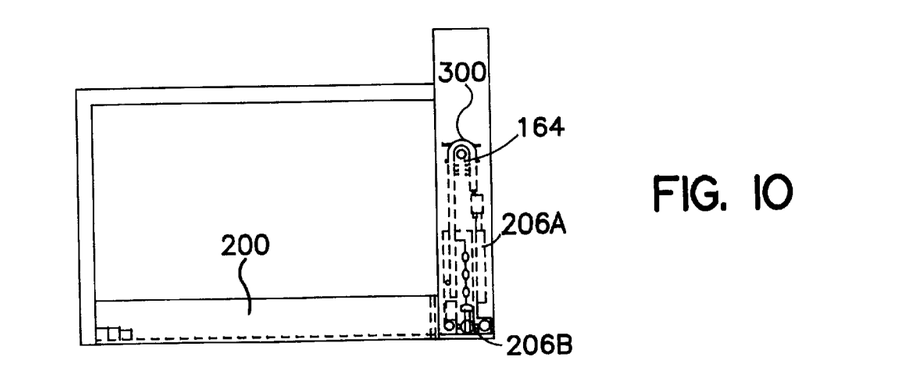
FIG. 10 is a side view of the torsion equalizer assembly in relation to the platform dog ears.

As best understood by viewing FIG. 9 in conjunction with FIG. 2, each dog ear is disposed through the lower cut-out "B" on restraining plate 36 and then positioned such that cross-member 186 is in confronting, but non-contacting relationship with restraining plate 36. In this position, a top and bottom guide roller 196, 206 on each respective dog ear is aligned with and inserted into its respective open channel 22 on each respective guide mast 20. As best seen from viewing FIGS. 10 and 15, it should be understood and appreciated that any forward or rearward platform tilting (as indicated by the heavy arrow in FIG. 15) will be virtually eliminated since each roller 206A (top) and 206B (bottom) have their respective centers aligned along a common vertical axis centered within said open channel, causing both rollers to always remain in contact against flanges 22A, 22B during the cantilever loading of platform base plate 180. FIG. 15 shows that when a load "F" is placed on plate 180, the plate will have a tendency to deflect downwardly, causing the top rollers (206A) to contact one flange, while the bottom roller (206B) simultaneously contacts the opposing flange. The result is the reactionary forces $R_1$ and $R_2$ resisting the forces of the rollers pushing against the flanges 22A, 22B, thereby eliminating forward and backward platform tilt.

The present invention will now be described with respect to the mechanism used for preventing lateral tilting of the platform which is caused by an eccentrically-loaded lifting platform base plate. Referring to FIGS. 8 through 11, it is seen that after dog ears 195, 205 are inserted through cut-out "B" (See FIG. 2), a roller chain 300 on each lateral side 183, 185 of platform base plate 180, has one end thereof connected to a respective chain attachment block 38 and another end thereof secured to a respective chain attachment post 197, 207. Each chain is also passed over a respective sprocket 164 attached to each torsion bar shaft end 161, 163. The sprockets 164 are attached to the torsion bar shaft 160 by keyway means. As FIGS. 11 through 13 emphasize, the header weldment 150 is provided with a plurality of end bearing means 166 and internal bearing means 168. Each bearing means is secured with a respective bearing block and said bearing block is likewise attached between members 152, 154 (See FIG. 11).

Operation of said torsion shaft equalizer assembly proceeds as follows. Referring first to FIG. 16, and then to FIGS. 8–10, when a load on the lifting platform 180 is found to be eccentric, the tension in the portion of the lift chains 300 on the platform side of the sprockets 164, will be greatest on the chain attachment corner nearest the load, rather than on the chain attachment corner furthest from the load. The imbalance of the chain tensions between each respective chain 300, will create a resultant net torque in the torsion bar shaft 160, which is connected between the two sprockets. This torque is resisted by an equivalent tension imbalance in the portion of the lift chains on the guide mast side of the sprockets, with the greatest tension occurring on the corner farthest from the load. The net result of the tensions in all four chain segments is equal to twice the load (due to the mechanical advantage caused by the sprocket), with the net result being that the load becomes balanced with respect to the centered hydraulic cylinder 100, due to the eccentric loads being transmitted through the torsion bar, from one side thereof to the other, via the sprockets 164 and the torsion bar shaft 160. Furthermore, it should be realized that because of the mechanical advantage gained by use of the sprockets 164, a two-to-one lift travel advantage is created with the present arrangement. By that it is meant that for every inch of cylinder piston rod travel, the platform would have traveled two inches. This advantageously means a shorter stroke hydraulic cylinder can be used.

The foregoing description has been provided to clearly define and completely describe the invention. Various modifications may be made without departing from the scope and spirit of the invention which is defined in the following claims.

What is claimed is:

1. A pallet-loading apparatus for positioning palletized loads at heights convenient for manual loading and unloading comprising:

an open-topped, three-sided enclosure formed of a rear wall and two spaced sidewalls, said rear wall formed of an opposed pair of interconnected guide masts, each of said sidewalls joined at two of their opposing ends to said opposed guide masts, said opposed guide masts each having a platform side and an exterior side, said platform side corresponding to a forward position and said exterior side corresponding to a rearward position, each of said sides having a respective plate joining each of said masts together to form a housing, said platform side plate of said housing having at least one vertical slot formed therein at each of a lateral end thereof;

a lift platform for holding a pallet disposed within said three-sided enclosure for a predetermined vertical movement therein, said platform having a front side, a back side and a pair of interconnecting sides, each of said sides including means extending therefrom and through said vertical slot, thereby forming an ear for receiving an end of said chain thereon in order to provide cantilever support to said platform;

a hydraulic lift system disposed within said housing including a hydraulic cylinder having a reciprocable piston rod therein and a torsion shaft equalizer assembly connected to and actionable upon movement of said hydraulic cylinder piston rod;

switch means operative upon said hydraulic system to control the flow of fluid therein whereby said lift platform may be positioned vertically at desired points within said enclosure such that said torsion shaft equalizer assembly provides movement of said platform without lateral tilting of said lift platform and without forward and rearward tilting of said lift platform.

2. The pallet loading apparatus of claim 1, wherein said torsion shaft equalizer assembly operably transfers an eccentric loading force placed on said lifting platform uniformly across said platform.

3. The pallet loading apparatus of claim 2, wherein said torsion shaft equalizer assembly includes a header weldmant for holding a torsion bar shaft therein, said shaft having a pair of ends, each of which is supported by respective bearing blocks that include bearings therein.

4. The pallet loading apparatus of claim 3, wherein said torsion bar shaft further includes respective sprockets attached thereto, outward of said bearings.

5. The pallet loading apparatus of claim 4, wherein a chain is draped over each respective sprocket, each of said chains having a respective first and second end, each of said chain first ends connected to said lifting platform and each of said chain second ends connected to a respective guide mast.

6. The pallet loading apparatus of claim 1, wherein each of said guide masts includes a respective open channel vertically disposed therein, said channel for receiving at least one pair of rollers therein, said at least one pair of rollers for assisting movement of said lift platform in a longitudinal direction.

7. The pallet loading apparatus of claim 6, wherein said at least one pair of rollers is attached to a dog ear formed on each of said side arms of said lift platform.

8. The pallet loading apparatus of claim 7, wherein said each of said at least one pair of rollers is disposed along a common vertical axis, said common vertical axis corresponding with a vertical axis of each respective open channel.

9. The pallet loading apparatus of claim 8, wherein said at least one pair of rollers disposed within each of said open channels prevents said platform from tilting towards and away from said forward and rearward positions.

10. The pallet loading apparatus of claim 1, wherein said lift platform switch includes a circuit for operation of said lift platform in one of an automatic and jog mode.

11. The pallet loading apparatus of claim 6, wherein said open channel is defined by a pair of aligned C-shaped angle irons.

12. The pallet loading apparatus of claim 6, wherein said open channel is formed by a C-shaped angle iron.

* * * * *